United States Patent
Bruls et al.

(10) Patent No.: US 6,740,708 B2
(45) Date of Patent: May 25, 2004

(54) PROCESS FOR THE PREPARATION OF AN IMPACT-RESISTANT POLYMER COMPOSITION

(75) Inventors: Wilhelmus G. M. Bruls, Geulle (NL); Johannes F. Repin, Brunssum (NL); Jan De Kroon, Heythuysen (NL)

(73) Assignee: DSM IP Assets B.V., Heerlen (NL)

( * ) Notice: Subject to any disclaimer, the term of this patent is extended or adjusted under 35 U.S.C. 154(b) by 0 days.

(21) Appl. No.: 10/014,801

(22) Filed: Dec. 14, 2001

(65) Prior Publication Data

US 2002/0156191 A1 Oct. 24, 2002

Related U.S. Application Data

(63) Continuation of application No. PCT/NL00/00352, filed on May 23, 2000.

(30) Foreign Application Priority Data

Jun. 14, 1999 (NL) .............................................. 1012324

(51) Int. Cl.$^7$ ............................ C08L 77/00; C08L 69/00
(52) U.S. Cl. ............................. 525/66; 525/63; 525/64; 525/65; 525/67; 525/92 B; 525/166; 525/179
(58) Field of Search ............................... 525/66, 63, 64, 525/65, 67, 92 B, 166, 179

(56) References Cited

U.S. PATENT DOCUMENTS

| 4,757,112 A | | 7/1988 | Phadke | 525/66 |
| 5,151,466 A | * | 9/1992 | Phadke | 525/177 |
| 5,242,975 A | * | 9/1993 | Modic | 525/66 |
| 5,244,972 A | * | 9/1993 | Phadke | 525/66 |
| 5,889,112 A | * | 3/1999 | Shih et al. | 525/63 |

FOREIGN PATENT DOCUMENTS

| EP | 0279502 | 8/1988 |
| EP | 0878510 | 11/1998 |

* cited by examiner

*Primary Examiner*—Ana L. Woodward
(74) *Attorney, Agent, or Firm*—Pillsbury Winthrop LLP

(57) ABSTRACT

An impact-resistant polymer composition exhibiting improved impact resistance at no loss in creep is obtained by melt-mixing a solid matrix polymer A with a solid composition containing the rubber composition dispersed in a matrix polymer B. The dispersion of rubber composition in matrix polymer B is obtained by melt mixing the matrix polymer B with a rubber composition which includes a functionality rubber and a non-functionality rubber. The amounts of the components are such that the impact-resistant polymer composition contains 0.5 to 75 parts by weight of the rubber composition per 100 parts by weight of the matrix polymers A and B. The composition may be used in various applications, including plugs, heat bridges for aluminum windows, hammer heads and the like.

15 Claims, No Drawings

PROCESS FOR THE PREPARATION OF AN IMPACT-RESISTANT POLYMER COMPOSITION

CROSS-REFERENCE TO RELATED APPLICATIONS

This is a Continuation of International Application No. PCT/NL/00352 filed May 23, 2000 which designated the U.S. and was published in the English language. The contents of this PCT application are incorporated in their entirety by reference.

The invention relates to a process for the preparation of an impact-resistant polymer composition containing 0.5–75 parts by weight of a rubber composition (per 100 parts by weight of the matrix polymer).

Such compositions are known from, inter alia, U.S. Pat. No. 4,174,358 and this patent publication discloses various processes for the preparation of these compositions. These processes all essentially comprise a rubber functionalization step followed by incorporation of the functionality rubber in the desired concentration into the matrix polymer.

These state-of-the-art polymer compositions in general exhibit a good impact resistance, which is determined, inter alia, to an important degree by the rubber content of the composition. However, the presence of the rubber composition causes the stiffness to decrease and the creep to increase.

For applications in which no or only minimal creep is allowed while a good impact resistance is required, for instance in plastic hammer heads, it is therefore necessary to have a polymer composition that possesses this combination of conflicting properties. Another application in which this combination of properties is required is that of plastic profiles that serve as heat bridge in metal window and door profiles and screw plugs, where toughness is required for assembly purposes while no creep may occur when the materials are subsequently subjected to a permanent load. Compositions obtained by the state-of-the-art process, however, cannot fully meet this requirement.

The aim of the invention therefore is a process for the preparation of an impact-resistant polymer composition that has an excellent impact resistance at no or only minimal creep.

This aim is achieved by melt mixing of a matrix polymer A with a composition comprising a dispersed rubber composition in a matrix polymer B, the dispersed rubber composition in matrix polymer B having been obtained by melt mixing of matrix polymer B with a rubber composition that contains at least one non-functionality rubber and one functionality rubber, in such amounts that the desired rubber concentration in the impact-resistant polymer composition is reached.

Also part of the invention are the composition obtainable by the process according to the invention and the products obtained from the composition according to the invention as well as the (granule) mixture of matrix polymer A and the dispersed rubber composition in matrix polymer B as needed for the process of the invention.

Matrix polymer A can in principle be chosen freely, but the process according to the invention offers advantages if polymer A is chosen from the group consisting of polyamides, polyesters, polyacetals and polycarbonates. The invention is effective in particular if polymer A is a polyamide or a polyester.

For matrix polymer B in principle any polymer can be chosen that can suitably be mixed with polymer A and in which the rubber composition can suitably be dispersed. Preferably, polymer B is chosen from the group consisting of polyamides, polyesters, polyacetals and polycarbonates. Even more preferably, polymers A and B are of the same type of polymer, for instance A and B are both polyamides, for instance an aliphatic and a semi-aromatic polyamide. Most preferably, A and B are identical.

The rubber composition dispersed in polymer B comprises at least one non-functionality rubber and at least one functionality rubber. Rubber is here understood to mean a polymeric compound with a glass transition temperature lower than 0° C., preferably lower than −20° C., most preferably lower than −40° C.

A rubber is called functionality when it contains groups that can react with matrix polymer B and/or A.

Examples of polymers covered by the definition of rubber are copolymers of ethylene and α-olefins, for instance ethylene-propylene rubbers. Very suitable for use in the process according to the invention are the so-called plastomers based on ethylene and C4–C12 olefins, for instance octene, and produced using a metallocene catalyst.

Other rubbers that can suitably be used in the process according to the invention are styrene-butadiene based block copolymers.

Functional groups can be introduced into the rubber in many ways. A great many preparation methods and examples of these functionality rubbers are described, for instance, in the above-mentioned U.S. patent publication U.S. Pat. No. 4,174,358. Several of these functionality rubbers are commercially available under different names. Very suitable are rubbers that are chemically modified by reaction with maleic anhydride or by graft polymerization of the rubber with an unsaturated dicarboxylic anhydride or an unsaturated dicarboxylic acid or an ester thereof, for instance maleic anhydride, itaconic acid and itaconic anhydride, fumaric acid and maleic acid or a glycidyl acrylate, for instance glycidyl methacrylate, and vinyl alkoxysilane. The functional groups are highly reactive relative to, inter alia, amino end groups in polyamides, hydroxyl end groups in polyesters and acid end groups in both polyamides and polyesters.

The content of compounds supplying functional groups in the functionality rubber may vary within wide limits, for instance between 0.01 and 5 wt. %. The best results are generally achieved with a content between 0.3 and 3 wt. %.

The weight ratio of non-functionality to functionality rubber may vary within wide limits and is determined in part by the functional groups content of the rubber and the available reactive groups in the matrix polymer. One skilled in the art can determine this by means of simple experiments. In general, this ratio will be between 10 and 0.1, preferably between 5 and 0.1.

The rubber composition content of the composition with matrix polymer B may vary within wide limits, for instance between 20 and 70 wt. %, calculated on the total weight of rubber composition + polymer B, preferably the rubber composition content is chosen as high as possible, for instance higher than 30 wt. %, more preferably higher than 40 wt. %. Very good results are achieved with contents of at least 50 wt. % or higher.

The non-functionality rubber and the rubber that is functionality may be identical or different. Combinations are for instance possible of an ethylene-α-olefin copolymer and the same ethylene-α-olefin copolymer modified with, for instance, maleic anhydride. The same ethylene-α-olefin copolymer may also be combined with, for instance, an acid-modified styrene-butadiene tri block copolymer.

Particularly good results are achieved with the process according to the invention when the rubber composition in matrix polymer B is present in finely dispersed particles. Preferably, the dispersed particles of the rubber composition are then built up of a core of non-functionality rubber and a shell of functionality rubber.

The composition of matrix polymer B with the rubber composition can be obtained by melt mixing of the constituent components. In doing so, use is preferably made of high shear forces and the conditions are chosen so that the viscosity in the melt of the rubber phase is higher than that of the polymer matrix. During the melt mixing process crosslinking of the rubber phase may optionally take place. However, a non-crosslinked rubber is preferred. Non-crosslinked rubber is here understood to be a rubber that is substantially not crosslinked. In practice, however, some degree of crosslinking can hardly be avoided during melt mixing at the high temperatures then prevailing. The resulting gel content will be lower than 50 wt. %, preferably lower than 30 wt. %, even more preferably lower than 10 wt. %. The gel content is here defined as the rubber fraction that is insoluble in the solvent that is suitable for the rubber in question. For ethylene-propylene copolymer rubbers, for instance, this solvent is xylene. When reference is made to crosslinking of the rubber composition, this is understood to mean the melt mixing process carried out in the presence of a vulcanization agent, for instance a peroxide.

Optionally, the rubber composition can first be crosslinked during incorporation of the composition into matrix polymer A. This process has the advantage that it can be performed under milder and better controllable conditions, so that less damage is done to the matrix polymer, while the process also has the advantage that mechanical properties can be adapted from case to case on the basis of similar compositions.

For mixing in the melt phase the customary techniques and equipment can be employed. Particularly suitable for production of the composition in polymer matrix B is, for instance, a co-rotating twin-screw extruder, while for mixing in of the composition into matrix polymer A in many cases a single-screw extruder, which may be directly prearranged in the injection moulding process, may suffice. Preferably, the mixing operations in the melt are carried out under an inert gas atmosphere.

During melt mixing optionally the customary additives and auxiliary materials for the polymer compositions can be added, for instance stabilizers, colourants, processing aids, for instance release agents, flame-retardant additives and fillers or reinforcing (fibre) materials. Preferably, the additives and auxiliary materials are introduced into the melt only after the rubber composition has been dispersed in the matrix polymer.

Most preferably, the auxiliary materials and additives are added to the melt of polymer A, optionally simultaneously with the mixing in of the composition of polymer matrix B or separate therefrom.

The invention will now be elucidated on the basis of the following examples and comparative examples.

| Materials: | |
|---|---|
| AKULON ® F235C | polyamide-6, rel. visc. 2.3, from DSM |
| AKULON ® 223 TP4 | blend of polyamide 6 and Excellor ® (80:20) from DSM, Netherlands |

| Materials: | |
|---|---|
| AKULON ® K 120 | Polyamide-6, rel. visc. 2.2, from DSM |
| EXXELOR ® | ethylene-propylene rubber modified with 0.7 wt. % maleic anhydride from Exxon, USA |
| KRATON ® FG 1901X | styrene-butadiene block copolymer, modified with 2 wt. % maleic anhydride from Shell, Netherlands |
| EXACT ® 8201 | ethylene-octene copolymer from DEX PLASTOMERS, Netherlands |
| EXACT ® MA | Maleic acid modified ethylene-octene copolymer, 0.9 wt. % MA |

EXAMPLES AND COMPARATIVE EXPERIMENTS

The above-mentioned materials were used to produce the compositions listed in Table 1.

All compositions were obtained by premixing the components in the solid phase and subsequently feeding them to a twin-screw extruder and mixing them using a temperature profile of 150 to 260° C.

The properties of compositions 2, 4, 6, 8, 10, 11 and 13 were compared (compositions 6, 8, 10 according to the process of the invention, the other ones being comparative experiments).

Points examined:
1) The morphology, in particular the appearance and the particle size in the rubber phase. To this end TEM, transmission electron microscopy, pictures were made.
2) The mechanical behaviour, specifically the impact resistance (Izod, notched) and the creep behaviour on the basis of practical tests.

Morphology: The rubber phase in compositions 2, 4, 6, 8, 10 and 13 was dispersed in the polyamide matrix. Composition 11 had 2 rubber phases, viz. very fine Kraton particles<100 nm and larger EXACT® particles, the diameter of which varied between 0.5 and 2 μm. These particles were generally provided with a very thin shell of KRATON® FG. In composition 10 all KPATON® FG was present in the shell around the EXACT® particles, which were present in a particle size of about 0.1–0.6 μm.

In all cases in which a combination of functionality rubber and a non-functionality rubber was applied, the particles in the rubber phase were observed to have a distinct sphere-shell structure.

Example 1 and Comparative Experiment A

Bars with a diameter of 8 cm were extruded from composition 10 and composition 2. From these bars, hammer heads were machined, which were attached to a wooden stem by means of a pin. The hammer head obtained from composition 2 after some time exhibited play relative to the stem (comp. Exp. A), while the head from composition 10 (Example 1) was still firmly attached after 14 days of testing.

Example 2 and Comparative Experiment B

From compositions 2, 4, 6, 8, 10 and 11 plugs for attaching screws in brickwork were injection moulded. After the plugs had been placed in a series of uniform holes and screws had been inserted, the force needed to draw the plug with the screw out of the hole was measured after fixed intervals. The results are outlined in Table 1.

The plugs from compositions 2, 4 and 11 (not according to the invention) are found to 'set' more rapidly, i.e. exhibit higher creep and can sooner be drawn out of the hole than the plugs from compositions 6, 8 and 10 according to the invention.

TABLE 1

| Composition, parts by weight | 1 | 2 | 3 | 4 | 5 | 6 | 7 | 8 | 9 | 10 | 11 | 12 | 13 |
|---|---|---|---|---|---|---|---|---|---|---|---|---|---|
| AKULON ® F 235C | 100 | 75 |  | 90 |  | 90 |  | 90 |  | 90 | 95 |  | 90 |
| AKULON ® K 120 |  |  | 50 |  | 50 |  | 50 |  | 60 |  |  | 50 |  |
| AKULON ® TP4 | — | 25 |  |  |  |  |  |  |  |  |  |  |  |
| EXXELOR ® | — |  | 50 |  | 20 |  |  |  |  |  |  |  |  |
| KRATON ® FG | — |  |  |  |  |  |  |  | 10 |  | 1 |  |  |
| C8-EXACT ® | — |  |  |  |  |  | 40 |  | 40 |  | 4 |  |  |
| C8-EXACT ® MZA | — |  |  |  |  |  | 10 |  |  |  |  | 50 |  |
| Composition 3 |  |  |  | 10 |  |  |  |  |  |  |  |  |  |
| Composition 5 |  |  |  |  |  | 10 |  |  |  |  |  |  |  |
| EPDM |  |  |  |  | 30 |  |  |  |  |  |  |  |  |
| Composition 7 |  |  |  |  |  |  |  | 10 |  |  |  |  |  |
| Composition 9 |  |  |  |  |  |  |  |  |  | 10 |  |  |  |
| Composition 12 |  |  |  |  |  |  |  |  |  |  |  |  | 10 |
| particle size [μm] | n.a. | 0.4–2 |  | 0.5–4 |  | 0.5–3 |  | 0.4–1.6 |  | 0.1–0.6 | 0.3–1.5 |  | 0.5–3.0 |
| IZOD notched 23° C. [kJ/m²] | 7.2 | 12.8 | NB | 12.5 | NB | 13.0 | NB | 13.5 | NB | 13.0 | 11.8 | NB | 12.4 |
| creep |  | — | — |  | ○ |  | + |  | + | — |  | + |  |

− does not meet the standard set
○ meets the standard set
+ more than meets the standard set

What is claimed is:

1. Process for the preparation of an impact-resistant polymer composition comprising a rubber composition dispersed in a matrix polymer, said process comprising melt mixing a solid matrix polymer A with a solid comprising said rubber composition dispersed in a matrix polymer B at a weight ratio of matrix polymer B to rubber composition in the range of 80:20 to 30:70, wherein the solid dispersion of said rubber composition in matrix polymer B is the product obtained by melt mixing of matrix polymer B with a rubber composition that contains at least one functionalized rubber containing groups that can react with matrix polymer A and/or B, and at least one non-functionalized rubber and wherein said impact-resistant rubber composition comprises 0.5–75 parts by weight of rubber composition per 100 parts by weight in total of matrix polymers A and B.

2. Process according to claim 1, wherein matrix polymer B is identical to matrix polymer A.

3. Process according to claim 1, wherein the weight ratio of matrix B to rubber composition lies between 60:40 and 30:70.

4. Process according to claim 3, wherein the non-functionality rubber is an ethylene (C4–C 12) a-olefin copolymer rubber.

5. Process according to claim 4, wherein the ethylene-α-olefin copolymer is obtained by polymerization in the presence of a metallocene catalyst.

6. Process according to claim 1, wherein the functionality rubber is present as a shell around a core of the non-functionality rubber.

7. Process according to claim 1, wherein the functionality rubber is derived from a rubber that is different from the non-functionality rubber.

8. Process according to claim 1, wherein the matrix polymers A and B are selected from the group consisting of polyamides, polyesters, polyacetals and polycarbonates.

9. Process according to claim 8, wherein the matrix polymers are each polyamides.

10. Process according to claim 1, wherein the functionality rubber comprises a functionality styrene-butadiene tri-block polymer.

11. Process according to claim 1, wherein the functionality rubbers are obtained by reaction with or by graft polymerization of a rubber with an unsaturated dicarboxylic acid anhydride, an unsaturated dicarboxylic acid or an unsaturated dicarboxylic acid ester.

12. Process according to claim 1, wherein the rubber is not crosslinked.

13. Process according to claim 1, wherein the weight ratio of matrix B to rubber composition lies between 50:50 and 30:70.

14. Process for the preparation of an impact-resistant polymer composition comprising a rubber composition dispersed in a matrix polymer, said process comprising feeding to an extruder, a solid matrix polymer A and a solid masterbatch comprising said rubber composition dispersed in a matrix polymer B, at a weight ratio of matrix polymer B to rubber composition in the range of 80:20 to 30:70, and melt-mixing the solid matrix polymer A and the solid masterbatch in the extruder to thereby form said impact-resistant polymer, wherein the dispersion of said rubber composition in matrix polymer B is the product obtained by melt mixing of matrix polymer B with a rubber composition that contains at least one functionality rubber containing groups that can react with matrix polymer A and/or B, and at least one non-functionality rubber and wherein said impact-resistant rubber composition comprises 0.5–75 parts by weight of rubber composition per 100 parts by weight in total of matrix polymers A and B.

15. Process according to claim 14, wherein the functionality rubber and/or the non-functionality rubber comprises ethylene-α-olefin copolymer obtained by polymerization in the presence of a metallocene catalyst.

* * * * *